(12) United States Patent
Bechstein et al.

(10) Patent No.: US 11,275,475 B2
(45) Date of Patent: *Mar. 15, 2022

(54) COMPLIANT MATERIAL FOR PROTECTING CAPACITIVE FORCE SENSORS AND INCREASING CAPACITIVE SENSITIVITY

(71) Applicant: Apple Inc., Cupertino, CA (US)

(72) Inventors: Daniel J. Bechstein, Mountain View, CA (US); Collin R. Petty, San Francisco, CA (US); Martin P. Grunthaner, Los Altos Hills, CA (US); Andrew W. Joyce, Santa Clara, CA (US); John R. Matthews, San Jose, CA (US); Pavan O. Gupta, Belmont, CA (US); Albert Lin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,658

(22) Filed: Jan. 5, 2021

(65) Prior Publication Data
US 2021/0124460 A1    Apr. 29, 2021

Related U.S. Application Data

(63) Continuation of application No. 16/399,958, filed on Apr. 30, 2019, now Pat. No. 10,921,943.

(51) Int. Cl.
*G06F 3/044*    (2006.01)
(52) U.S. Cl.
CPC ................. *G06F 3/0445* (2019.05)

(58) Field of Classification Search
CPC ................................... G06F 3/0445
See application file for complete search history.

(56) References Cited

U.S. PATENT DOCUMENTS

| 3,783,394 A | 1/1974 | Avery |
| 4,310,840 A | 1/1982 | Williams et al. |
| 4,539,554 A | 9/1985 | Jarvis et al. |
| 4,745,565 A | 5/1988 | Garwin |

(Continued)

FOREIGN PATENT DOCUMENTS

| EP | 2357547 | 8/2011 |
| WO | WO 20/079995 | 4/2020 |

OTHER PUBLICATIONS

U.S. Appl. No. 17/481,122, filed Sep. 21, 2021, Bechstein et al.

*Primary Examiner* — Mihir K Rayan
(74) *Attorney, Agent, or Firm* — Brownstein Hyatt Farber Schreck, LLP

(57) ABSTRACT

A compliant material, such as a conductive foam, is positioned in the dielectric or capacitive gap between drive and sense electrodes and/or other conductive elements of a capacitive and/or other force sensor, such as a TFT or other display element and a sensor assembly. The compliant material prevents damage by preventing and/or cushioning contact. The compliant material may be conductive. By being conductive and being positioned between the electrodes while still being separated from one or more of the electrodes, the compliant material also shortens the effective electrical distance between the electrodes. As a result, the force sensor may be more sensitive than would otherwise be possible while being less vulnerable to damage.

20 Claims, 19 Drawing Sheets

(56) References Cited

U.S. PATENT DOCUMENTS

| | | | |
|---|---|---|---|
| 5,008,497 A | 4/1991 | Asher | |
| 5,050,034 A | 9/1991 | Hegner | |
| 5,241,308 A | 8/1993 | Young | |
| 5,543,588 A | 8/1996 | Bisset et al. | |
| 5,625,292 A | 4/1997 | Crook | |
| 6,002,389 A | 12/1999 | Kasser | |
| 6,278,888 B1 | 8/2001 | Hayes, Jr. et al. | |
| 6,501,529 B1 | 12/2002 | Kurihara | |
| 6,545,495 B2 | 4/2003 | Warmack et al. | |
| 6,567,102 B2 | 5/2003 | Kung | |
| 6,664,489 B2 | 12/2003 | Kleinhans et al. | |
| 6,723,937 B2 | 4/2004 | Englemann et al. | |
| 6,809,280 B2 * | 10/2004 | Divigalpitiya | G06F 3/0445 200/512 |
| 7,006,078 B2 | 2/2006 | Kim | |
| 7,106,311 B2 | 9/2006 | Tsang | |
| 7,109,978 B2 | 9/2006 | Gillespie et al. | |
| 7,154,481 B2 | 12/2006 | Cross et al. | |
| 7,158,122 B2 | 1/2007 | Roberts | |
| 7,216,048 B2 | 5/2007 | Wang et al. | |
| 7,242,395 B2 | 7/2007 | Kurashima et al. | |
| 7,378,856 B2 | 5/2008 | Peine | |
| 7,479,790 B2 | 1/2009 | Choi | |
| 7,522,019 B2 | 4/2009 | Bhave et al. | |
| 7,567,240 B2 | 7/2009 | Peterson et al. | |
| 7,595,788 B2 | 9/2009 | Son | |
| 7,663,612 B2 | 2/2010 | Bladt | |
| 7,681,432 B2 | 3/2010 | Hay et al. | |
| 7,784,366 B2 | 8/2010 | Daverman et al. | |
| 7,816,838 B2 | 10/2010 | Leskinen et al. | |
| 7,825,907 B2 | 11/2010 | Choo et al. | |
| 7,884,315 B2 | 2/2011 | Andre et al. | |
| 8,018,568 B2 | 9/2011 | Allemand et al. | |
| 8,120,588 B2 | 2/2012 | Klinghult | |
| 8,248,081 B2 | 8/2012 | Maharyta et al. | |
| 8,261,621 B2 | 9/2012 | Parikh | |
| 8,266,971 B1 | 9/2012 | Jones | |
| 8,294,226 B2 | 10/2012 | Pomposo Alonso et al. | |
| 8,390,481 B2 | 3/2013 | Pance et al. | |
| 8,576,182 B2 | 11/2013 | Hristov | |
| 8,866,796 B2 | 10/2014 | Shepelev et al. | |
| 8,887,584 B2 | 11/2014 | Tohmyoh et al. | |
| 8,913,021 B2 | 12/2014 | Elias et al. | |
| 8,996,166 B2 | 3/2015 | Jenkinson | |
| 9,001,045 B2 | 4/2015 | Laitinen et al. | |
| 9,013,195 B2 | 4/2015 | Kremin | |
| 9,019,209 B2 | 4/2015 | Geaghan | |
| 9,024,907 B2 | 5/2015 | Bolender | |
| 9,041,659 B2 | 5/2015 | Perski et al. | |
| 9,057,653 B2 | 6/2015 | Schediwy et al. | |
| 9,069,426 B2 | 6/2015 | Pance et al. | |
| 9,086,768 B2 | 7/2015 | Elias et al. | |
| 9,201,547 B2 | 12/2015 | Elias et al. | |
| 9,268,431 B2 | 2/2016 | King et al. | |
| 9,323,353 B1 | 4/2016 | Sivertsen | |
| 9,329,719 B2 | 5/2016 | Mölne et al. | |
| 9,377,907 B2 | 6/2016 | Shahparnia | |
| 9,459,746 B2 | 10/2016 | Rosenberg et al. | |
| 9,535,549 B2 | 1/2017 | Pyoun | |
| 9,557,857 B2 | 1/2017 | Schediwy | |
| 9,921,679 B2 | 3/2018 | Son et al. | |
| 9,990,087 B2 | 6/2018 | Richards | |
| 10,068,728 B2 | 9/2018 | Huska et al. | |
| 10,242,810 B2 | 3/2019 | Mahajan et al. | |
| 10,503,329 B2 | 12/2019 | Sleeman et al. | |
| 10,605,628 B2 | 3/2020 | Sleeman et al. | |
| 10,644,383 B2 | 5/2020 | Lima et al. | |
| 10,921,943 B2 * | 2/2021 | Bechstein | G06F 3/0445 |
| 2005/0024065 A1 | 2/2005 | Umeda et al. | |
| 2007/0074913 A1 | 4/2007 | Geaghan et al. | |
| 2008/0068229 A1 | 3/2008 | Chuang | |
| 2009/0002199 A1 | 1/2009 | Lainonen et al. | |
| 2010/0148813 A1 | 6/2010 | Erickson | |
| 2010/0207905 A1 | 8/2010 | Chang et al. | |
| 2011/0018558 A1 | 1/2011 | Saito et al. | |
| 2011/0084932 A1 | 4/2011 | Simmons et al. | |
| 2011/0090174 A1 | 4/2011 | Lin | |
| 2011/0163991 A1 | 7/2011 | Tout | |
| 2011/0235156 A1 | 9/2011 | Kothari et al. | |
| 2012/0280934 A1 | 11/2012 | Ha et al. | |
| 2012/0319987 A1 | 12/2012 | Woo | |
| 2013/0016060 A1 | 1/2013 | Pereverzev et al. | |
| 2013/0018489 A1 | 1/2013 | Grunthaner et al. | |
| 2013/0278539 A1 | 10/2013 | Valentine et al. | |
| 2013/0307810 A1 | 11/2013 | Verweg et al. | |
| 2013/0342468 A1 | 12/2013 | Hekstra | |
| 2014/0104184 A1 | 4/2014 | Meador et al. | |
| 2015/0070037 A1 | 3/2015 | Pragada et al. | |
| 2019/0114004 A1 | 4/2019 | Lee et al. | |
| 2019/0189899 A1 | 6/2019 | Sieber et al. | |
| 2020/0348795 A1 | 11/2020 | Bechstein et al. | |

* cited by examiner

COMPLIANT MATERIAL FOR PROTECTING CAPACITIVE FORCE SENSORS AND INCREASING CAPACITIVE SENSITIVITY

CROSS-REFERENCE TO RELATED APPLICATION

This application is a continuation of U.S. patent application Ser. No. 16/399,958, filed Apr. 30, 2019, the contents of which are incorporated herein by reference as if fully disclosed herein.

FIELD

The described embodiments relate generally to force sensors. More particularly, the present embodiments relate to compliant materials that can protect capacitive force sensors and increase capacitive sensitivity.

BACKGROUND

Electronic devices are increasingly prevalent. These electronic devices use a wide variety of different components to obtain input. Examples of such input components include, but are not limited to, keyboards, virtual keyboards, computer mice, speakers, microphones, displays, touch surfaces, touch sensors, force sensors, buttons, sliders, dials, and so on.

Electronic devices are also increasingly portable. Portability may limit the kinds and/or number of input components that may be used in an electronic device. This may put demands on the input components that remain to distinguish among more different kinds of input, increase performance and/or sensitivity, and so on.

SUMMARY

The present disclosure relates to a compliant material for protecting capacitive force sensors and increasing capacitive sensitivity. A compliant material, such as a conductive foam, may be positioned in the dielectric gap between drive and sense electrodes and/or other conductive elements of a capacitive and/or other force sensor, such as a TFT or other display element and a sensor assembly. The compliant material may prevent damage by preventing and/or cushioning contact. The compliant material may be conductive. By being conductive and being positioned between the electrodes while still being separated from one or more of the electrodes, the compliant material may also shorten the effective electrical distance between the electrodes. As a result, the force sensor may be more sensitive than would otherwise be possible while being less vulnerable to damage.

In various embodiments, an electronic device includes a housing; a display coupled to the housing and configured to receive a force, further configured to deform in response to the force; a sense electrode positioned within the housing and capacitively coupled to the display across an air gap defined between the sense electrode and the display; a processing unit operative to estimate an amount of the force based, at least in part, on a change in capacitance between the display and the sense electrode; and a conductive compliant material. The conductive compliant material is positioned in the housing within the air gap between the display and the sense electrode.

In some examples, the display is operable to contact the conductive compliant material during deformation. In other examples, the display remains separate from the conductive compliant material during deformation.

In a number of examples, the conductive compliant material is coupled to at least one of the display or the sense electrode. In some examples, the electronic device further includes a midplate coupled to the housing between the sense electrode and the display wherein the conductive compliant material is coupled to the midplate. In various examples, the conductive compliant material is coupled to the sense electrode by a conductive adhesive. In a number of examples, the electronic device further includes an insulating material coating the conductive compliant material.

In some embodiments, an electronic device includes a cover; a force sensor that is operable to measure a force exerted on the cover that changes a capacitive gap of the force sensor, the force sensor including a display component coupled to the cover and a sensor assembly coupled to a substrate across an air gap; and a compliant material positioned in the air gap. The compliant material includes a conductive portion, decreases an effective electrical distance of the capacitive gap, and prevents damage to the force sensor by absorbing at least a portion of the force.

In various examples, the compliant material includes the conductive portion and a nonconductive portion. In some examples, the compliant material includes a first conductive material connected to a sensing electrode of the force sensor and a second conductive material that functions as a shield electrode. In various implementations of such examples, the compliant material further includes insulating material separating the first conductive material and the second conductive material.

In some examples, the compliant material includes at least one of a conductive foam, a silicone gasket, an air loop gasket, a fabric, or a conductive adhesive. In a number of examples, the compliant material is compressible. In various examples, the compliant material has a thickness of approximately 250-950 microns.

In a number of embodiments, an electronic device includes a housing; a drive electrode that is operable to deform when a force is exerted; a sense electrode that is operable to detect a change in capacitance when the drive electrode deforms, the sense electrode separated from the drive electrode by a gap; and a conductive compliant material. The conductive compliant material is positioned in the gap and electrically connected to the sense electrode, the conductive compliant material separated from the drive electrode in the absence of the force and contacted by the drive electrode when the force is exerted.

In some examples, the sense electrode is resistively coupled to the conductive compliant material. In other examples, the sense electrode is capacitively coupled to the conductive compliant material.

In various examples, the electronic device further includes a shield electrode capacitively coupled to the conductive compliant material. In some implementations of such examples, the electronic device further includes a nonconductive material separating the shield electrode and the conductive compliant material. In various such examples, the nonconductive material separates the sense electrode and the conductive compliant material.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
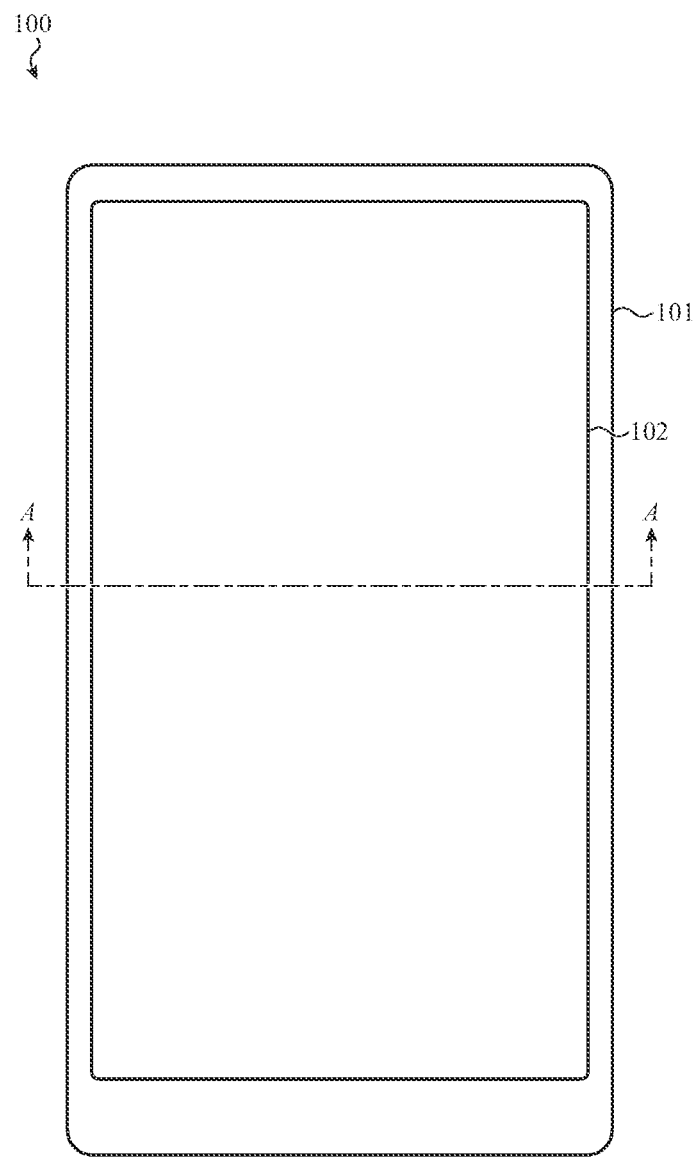
FIG. 1 depicts an example electronic device that uses a compliant material to protect and/or increase sensitivity in capacitive force sensors.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

Many sensors that can be used to detect touch and/or force include conductive elements separated by a dielectric or capacitive gap, such as an air gap. Applied force may cause one or more of the conductive elements to deform into the dielectric gap, changing a capacitance or resistance between the conductive elements. Changes in capacitance or resistance between the conductive elements may be measured to detect one or more inputs, estimate a non-binary amount of an applied force, estimate a location of a touch or applied force, and so on.

The sensitivity of such a sensor may depend on various factors. These factors may include the size and/or the area of the conductive elements, the proximity of the conductive elements to each other, and so on. Such sensors may be most sensitive when the conductive elements are as large as possible and as close to each other as possible. The size and/or the area of the conductive elements may be limited by the constraints of an electronic device in which the sensor is incorporated. For example, the size and/or the area of the conductive elements may be constrained by a housing of the electronic device, placement of other components within the electronic device, and so on. The factor that is most easily controlled may be the proximity of the conductive elements to each other.

However, the conductive elements may be subject to damage. The conductive elements may be damaged when an applied force causes one or more of the conductive elements to contact the other (or "bottom out"). In some implementations, one or more of the conductive elements may be particularly fragile, such as when such a thin-film-transistor (TFT) component or other conductive component (such as a metal component, indium tin oxide component, and so on) of a liquid crystal display (LCD) and/or other display (such as a light-emitting diode or LED display, an organic LED or OLED display, a cathode ray tube or CRT display, an electroluminescent display or ELD, a plasma display panel or PDP, an active-matrix OLED or AMOLED display, a quantum dot or QLED display, and so on) and/or sensor (such as one or more touch sensors, force sensors, thin film sensors, and so on) in a display stack. Likewise, one or more of the conductive elements may be a system-in-a-package (SIP) or other integrated circuit (IC) that includes an electrode that the SIP may use to estimate the location and/or non-binary amount of a force applied to the display and/or cover (though in some implementations the SIP may instead perform a binary determination as to whether a force and/or a threshold amount of force is applied, such as to emulate a button click/not-clicked experience), cover glass, and/or or other surface coupled thereto. The display and/or SIP may be damaged if an impact, force, or other occurrence causes the display and/or component thereof to contact the SIP and/or component thereof. Such damage may impair and/or disable operation of one or more components and may be expensive and/or difficult to repair, perhaps involving replacement of the component and/or device in which the component is incorporated.

The following disclosure relates to a compliant material for protecting capacitive force sensors and increasing capacitive sensitivity. A compliant material, such as a conductive foam, may be positioned in the dielectric or capacitive gap between drive and sense electrodes and/or other conductive elements of a capacitive and/or other force sensor, such as a TFT or other display element and a sensor assembly. The compliant material may prevent damage by preventing and/or cushioning contact. The compliant material may be conductive. By being conductive and being positioned between the electrodes while still being separated from one or more of the electrodes, the compliant material may also shorten the effective electrical distance between the electrodes. As a result, the force sensor may be more sensitive than would otherwise be possible while being less vulnerable to damage.

These and other embodiments are discussed below with reference to FIGS. 1-16. However, those skilled in the art will readily appreciate that the detailed description given herein with respect to these Figures is for explanatory purposes only and should not be construed as limiting.

FIG. 1 depicts an example electronic device 100 that uses a compliant material to protect and/or increase sensitivity in capacitive force sensors. The electronic device 100 may include a housing 101 and a cover 102 and/or other cover glass or touch surface. Although the electronic device 100 is shown as a portable computing device, it is understood that this is an example. In various implementations, the electronic device 100 may be any kind of electronic device, such as a desktop computing device, a laptop computing device, a mobile computing device, a tablet computing device, a smart phone, a digital media player, a wearable device, a kitchen appliance, a vehicle, and so on without departing from the scope of the present disclosure.

Figure 2A:
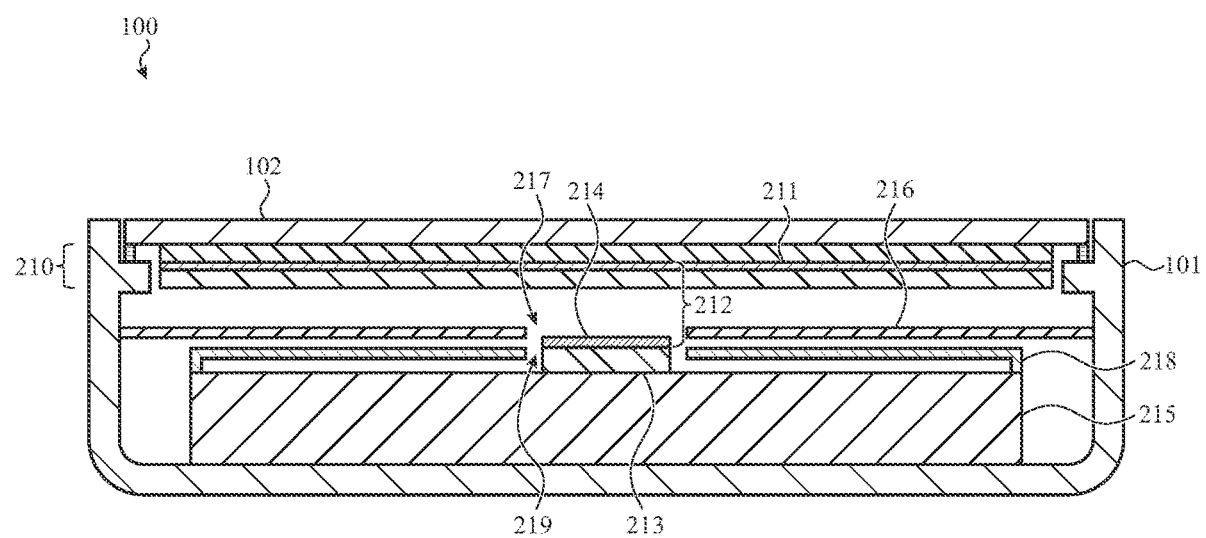
FIG. 2A depicts an example cross section of the example electronic device of FIG. 1, taken along line A-A of FIG. 1.

FIG. 2A depicts an example cross section of the example electronic device 100 of FIG. 1, taken along line A-A of FIG. 1. The electronic device 100 may include a display 210 that may include one or more conductive components 211 (which may be a metal component, indium tin oxide component, and so on, such as an LCD that includes a TFT component), a sensor assembly 213 or sensing that may include one or more sense electrodes, and a compliant material 214 that is disposed in a dielectric or capacitive gap 212 (such as an air gap, which may be approximately 1.8 mm in the absence of force applied to the cover 102) between the conductive component 211 and/or the display 210 and the sensor assembly 213. The compliant material 214 may be conductive.

Figure 2B:
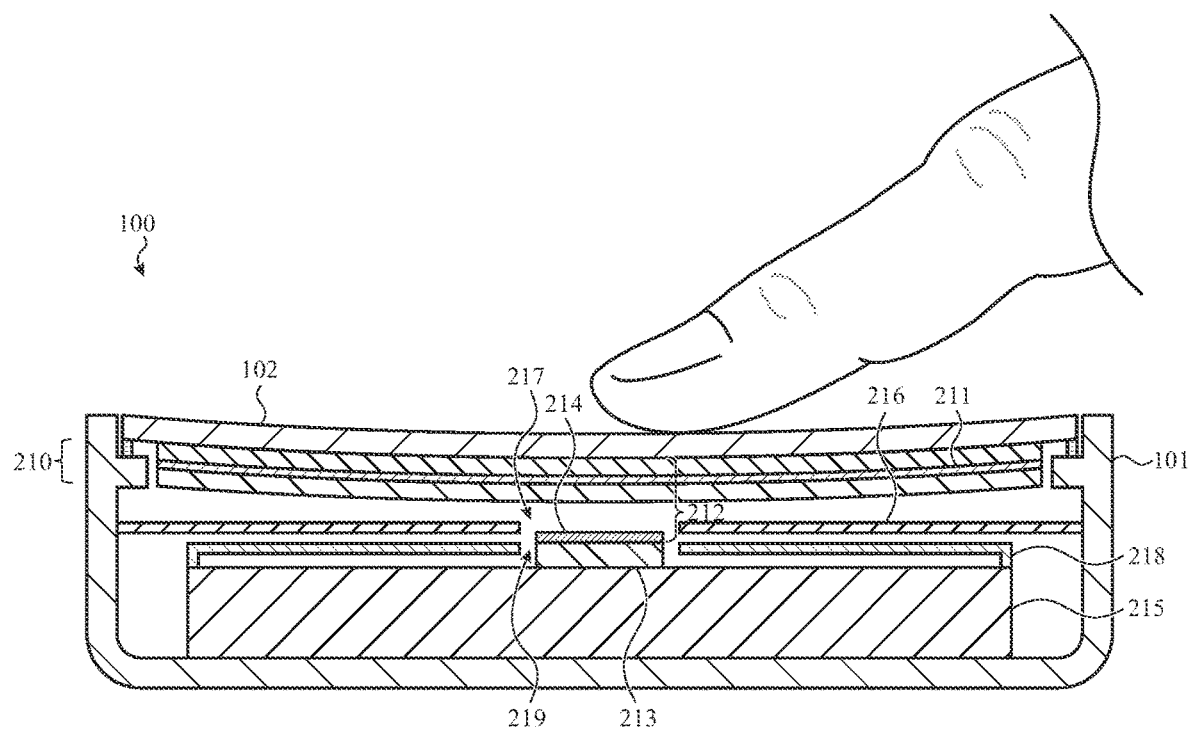
FIG. 2B shows the example electronic device of FIG. 2A when a force applied to the cover deforms the display.

The conductive component 211 and the sensor assembly 213 may form a force sensor that the electronic device 100 may use to estimate a touch, a force, a location of a force, and/or a non-binary amount of a force and so on applied to the cover 102. For example, the electronic device 100 may estimate such using a change in a capacitance and/or resistance between the conductive component 211 and the sensor assembly 213 that may change as the conductive component 211 and/or the cover 102 and/or the display 210 deforms with respect to the sensor assembly 213, as shown in FIG. 2B. By way of illustration, the conductive component 211 may be driven with one or more voltages as a drive electrode and one or more electrodes of the sensor assembly 213 may be monitored as one or more sense electrodes to determine one or more capacitances and/or changes in capacitance between the one or more drive and sense electrodes.

In the absence of the compliant material 214, the sensor assembly 213 could possibly contact the bottom of the display 210, thus potentially damaging either the sensor assembly 213 and/or any sensitive component in the display 210. As such, the compliant material 214 may prevent damage by preventing and/or cushioning contact between the display 210 and the sensor assembly 213. This may result in a "soft bottom out." For example, the compliant material 214 may compress and/or otherwise deform to absorb force. As discussed above, the compliant material 214 may be conductive. By being conductive and being positioned between the conductive component 211 and/or the display 210 and the sensor assembly 213 while still being separated from one or more of the conductive component 211 and the sensor assembly 213, the compliant material 214 may also shorten the effective electrical distance between the conductive component 211 and the sensor assembly 213. As a result, the force sensor including the conductive component 211 and the sensor assembly 213 may be more sensitive than would otherwise be possible while being less vulnerable to damage.

The compliant material 214 may be formed of a variety of different materials. In some examples, the compliant material 214 may be a conductive foam (such as an acrylic foam, an acrylic based foam, a foam doped with nickel and/or other metals, an acrylic pressure sensitive adhesive foam, an open cell foam, a closed cell foam, a polymer foam, a microcellular polymer foam, a polyurethane foam, a melamine foam, a foam sold under the brand name Singleton Shieldite EM-PO070S or similar thereto, a foam sold under the brand name Singleton Shieldite EM-PO050S or similar thereto, a foam sold under the brand name Rogers Condux Plus 0.3 or similar thereto, a foam sold under the brand name Rogers Condux Plus 0.3 or similar thereto, a foam sold under the brand name 3M MSG7060S or similar thereto, and so on). In a number of examples, open cell foams may have advantages over closed cell foams as air pockets in closed cell foams may result in drift (such as mechanical drift, temperature drift, and so on). Harder foams may have the advantage of more rigidity whereas softer foams may have the advantage of greater compressibility. In various examples, the compliant material 214 may be a conductive fabric. In other examples, the compliant material 214 may be a conductive gel. In still other examples, the compliant material 214 may be a conductive elastomer. In yet other examples, the compliant material 214 may be a silicone gasket, an air loop gasket, a conductive adhesive, and/or other conductive materials that are compliant. In a number of examples, the compliant material 214 may be an assembly of a number of different conductive and nonconductive materials. Various configurations are possible and contemplated without departing from the scope of the present disclosure.

The compliant material 214 may have a variety of different thicknesses. For example, the compliant material 214 may have a thickness of 330 μm, 650 μm, 800 μm, and so on. The thickness of the compliant material 214 may correspond to an amount that the compliant material 214 is operable to compress when contacted by the display 210 and/or other component when a force is exerted, an impact occurs, and so on. For example, a compliant material 214 having a thickness of 800 μm may be operative to compress up to approximately 33% when contacted by the display 210 and/or other component when a force is exerted, an impact occurs, and so on. By way of another example, a compliant material 214 with a thickness of 650 μm may be operative to compress up to approximately 17% when contacted by the display 210 and/or other component when a force is exerted, an impact occurs, and so on. In yet another example, a compliant material 214 with a thickness of 330 μm may be sufficiently thin that the compliant material 214 is not contacted by the display 210 and/or other component when a force is exerted, an impact occurs, and so on. Sensitivity may increase as thickness increases. Further, greater thicknesses may allow for lower force noise in force sensor applications. Various configurations are possible and contemplated without departing from the scope of the present disclosure.

The electronic device 100 may also include a substrate 215 and/or other component that electrically, mechanically, communicably, and/or otherwise connects the sensor assembly 213 to one or more other components. For example, the substrate may be a main logic board and/or other printed circuit board, flexible circuit, and so on.

The electronic device 100 may further include one or more conductive components (such as components formed of metal and/or other conductive materials) that may be disposed between various portions of the display 210, the conductive component 211, the compliant material 214, and/or the sensor assembly 213. Such conductive components may be configured so as to not interfere with the force sensor.

For example, the electronic device 100 may include a first structural element 216 that is configured as a midplate to provide rigidity and/or other structural support to the housing 101. By way of another example, the electronic device 100 may include a second structural element 218 that is configured as a cowl to restrain one or more wires and/or other components to the substrate 215. The first structural element 216 may be formed metal and/or include one or more metal portions and may define one or more apertures 217 to provide clearance between one or more edges of the first structural element 216 and the compliant material 214 and/or the sensor assembly 213 to prevent electrical interference. Similarly, the second structural element 218 may be formed metal and/or include one or more metal portions and may define one or more apertures 219 to provide clearance between one or more edges of the second structural element 218 and the compliant material 214 and/or the sensor assembly 213 to prevent electrical interference.

Figure 3:
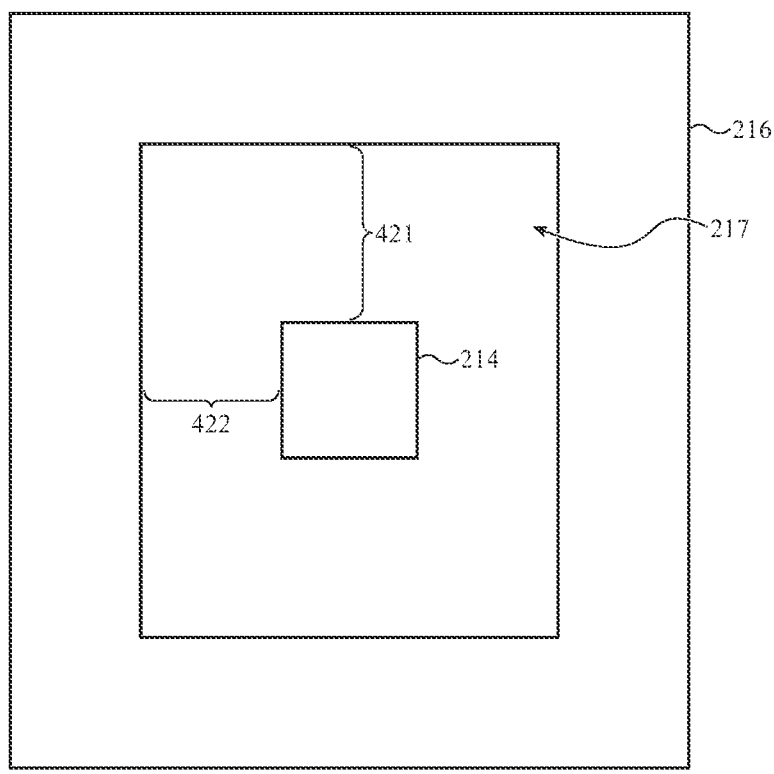
FIG. 3 depicts example clearances between the compliant material and the sides of the aperture in the first structural element of FIG. 1 with other components removed for clarity.

By way of illustration, FIG. 3 depicts example clearances 421 and 422 between the compliant material 214 and the sides of the aperture 217 in the first structural element 216 of FIG. 1 with other components removed for clarity. These clearances 421 and 422 may prevent the first structural element 216 from electrically interfering with a capacitance and/or a resistance between the conductive component 211 and the sensor assembly 213 of FIG. 2A.

Returning to FIG. 2A, the first structural element 216 and/or the second structural element 218 may be optional. In various implementations, the electronic device 100 may function without the first structural element 216 and/or the second structural element 218. The first structural element 216 and/or the second structural element 218 may function as a shield to prevent damage to the display 210 to prevent the display 210 from bottoming out against the sensor assembly 213 and/or another component, resulting in damage to the display 210. The first structural element 216 and/or the second structural element 218 may be omitted in some implementations where components below the display 210 are otherwise cushioned by another mechanism and/or are spaced sufficiently far from the display 210 to avoid damage to the display 210 from bottoming out. Various configurations are possible and contemplated without departing from the scope of the present disclosure.

In some examples, the aperture 217 in the first structural element 216 and/or the aperture 219 in the second structural element 218 may be omitted. For example, if the first structural element 216 and/or the second structural element 218 are formed of one or more nonconductive materials, the aperture 217 in the first structural element 216 and/or the aperture 219 in the second structural element 218 may be omitted. By way of another example, if the sensor assembly 213 is not configured to sense movement and/or deformation of the conductive component 211 and/or another component of the display 210, the aperture 217 in the first structural element 216 and/or the aperture 219 in the second structural element 218 may be omitted. Various configurations are possible and contemplated without departing from the scope of the present disclosure.

In this example, the compliant material 214 is shown as coupled to the sensor assembly 213. However, it is understood that this is an example. In various implementations, the compliant material 214 may instead be coupled to the display 210, to an intermediate component between the display 210 and the sensor assembly 213, and so on. Various configurations are possible and contemplated without departing from the scope of the present disclosure.

Further, in this example, the conductive component 211 is shown as a TFT component and the display 210 is shown as an LCD. However, it is understood that this is an example. In various implementations, the conductive component 211 may be any kind of conductive component of any kind of display, such as an LED display, an OLED display, a CRT display, an ELD, a PDP, an AMOLED display, a QLED display, and so on. Various configurations are possible and contemplated without departing from the scope of the present disclosure.

Figure 4A:
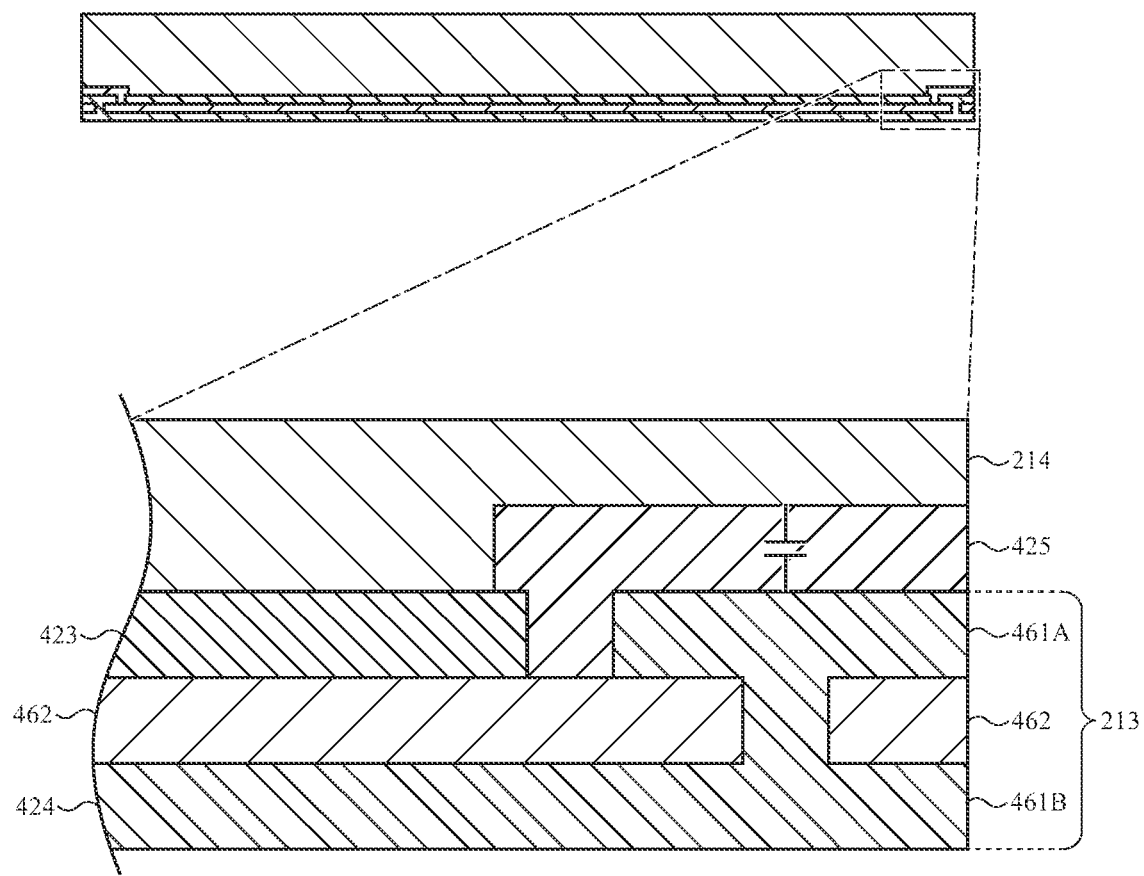
FIG. 4A depicts a first example of a compliant material and sensor assembly stack that may be used in the example electronic device of FIG. 2A.

FIG. 4A depicts a detail of a cross section side view of a first example of a compliant material 214 and sensor assembly 213 stack that may be used in the example electronic device 100 of FIG. 2A. In this example, the sensor assembly 213 may include a sense electrode 423 and a ground electrode 424. The ground electrode 424 may be formed from two layers 461A, 461B of copper or other conductive material connected through a layer of nonconductive material 462. However, it is understood that this is an example and that in other implementations the ground electrode 424 may be formed of a single layer, three or more layers, and so on without departing from the scope of the present disclosure. The ground electrode 424 may be physically coupled to the compliant material 214 via a layer of nonconductive material 425, such as a solder mask. As such, the ground electrode 424 may be capacitively coupled to the compliant material 214 to form a capacitor. The sense electrode 423 may be physically coupled to the compliant material 214. As such, the sense electrode 423 may be resistively coupled to the compliant material 214. This may be referred to as an "open configuration." Various configurations are possible and contemplated without departing from the scope of the present disclosure.

Figure 4B:
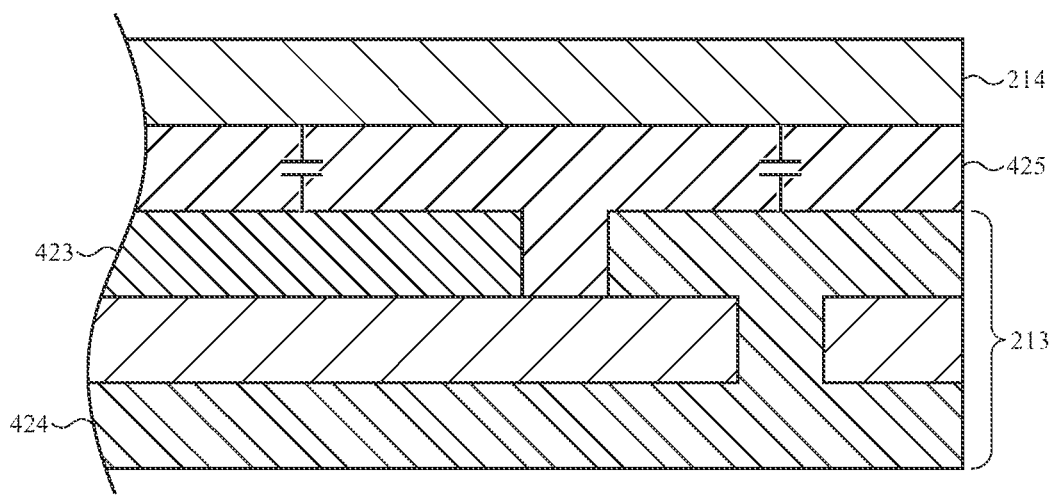
FIG. 4B depicts a second example of a compliant material and sensor assembly stack that may be used in the example electronic device of FIG. 2A.

FIG. 4B depicts a cross section side view of a second example of a compliant material 214 and sensor assembly 213 stack that may be used in the example electronic device 100 of FIG. 2A. Similar to FIG. 4A, in this example, the sensor assembly 213 may include a sense electrode 423 and a ground electrode 424. Unlike FIG. 4A, the sense electrode 423 may be physically coupled to the compliant material 214 via the layer of nonconductive material 425. As such, both the ground electrode 424 and the sense electrode 423 may be capacitively coupled to the compliant material 214, forming two capacitors. This may be referred to as a "closed configuration." This closed configuration may have a signal degradation compared to the open configuration of FIG. 4A, but may be less vulnerable to shorting. Various configurations are possible and contemplated without departing from the scope of the present disclosure.

Figure 4C:
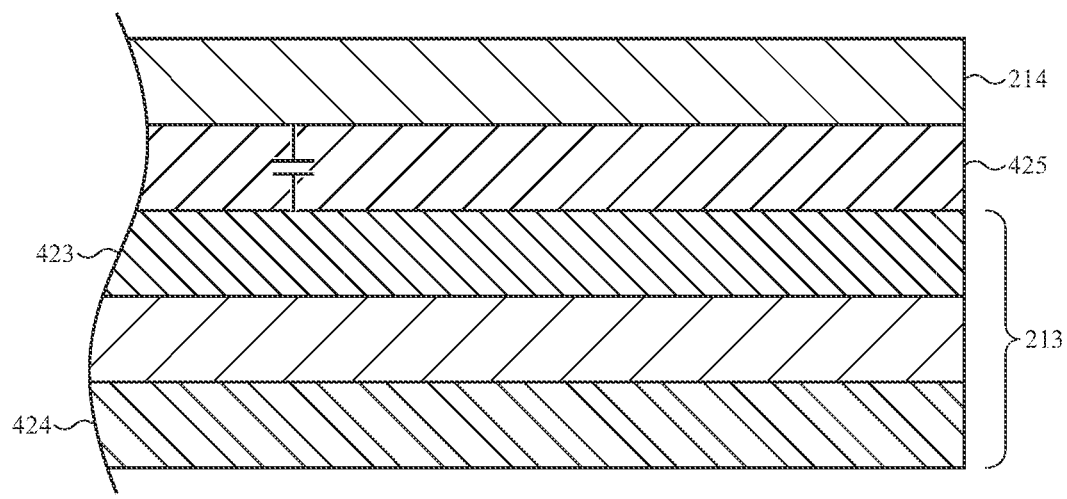
FIG. 4C depicts a third example of a compliant material and sensor assembly stack that may be used in the example electronic device of FIG. 2A.

FIG. 4C depicts a cross section side view of a third example of a compliant material 214 and sensor assembly 213 stack that may be used in the example electronic device 100 of FIG. 2A. Similar to FIG. 4A, in this example, the sensor assembly 213 may include a sense electrode 423 and a ground electrode 424. Unlike FIG. 4A, the ground electrode 424 may be separated from the compliant material 214 such that the ground electrode 424 is not capacitively or resistively coupled to the compliant material 214. This arrangement may not be subject to the coupling resistance modulation to which FIG. 4A may be vulnerable and may avoid signal loss through the capacitive divider which the nonconductive material 425 may function as between the two capacitors. Various configurations are possible and contemplated without departing from the scope of the present disclosure.

Figure 5:
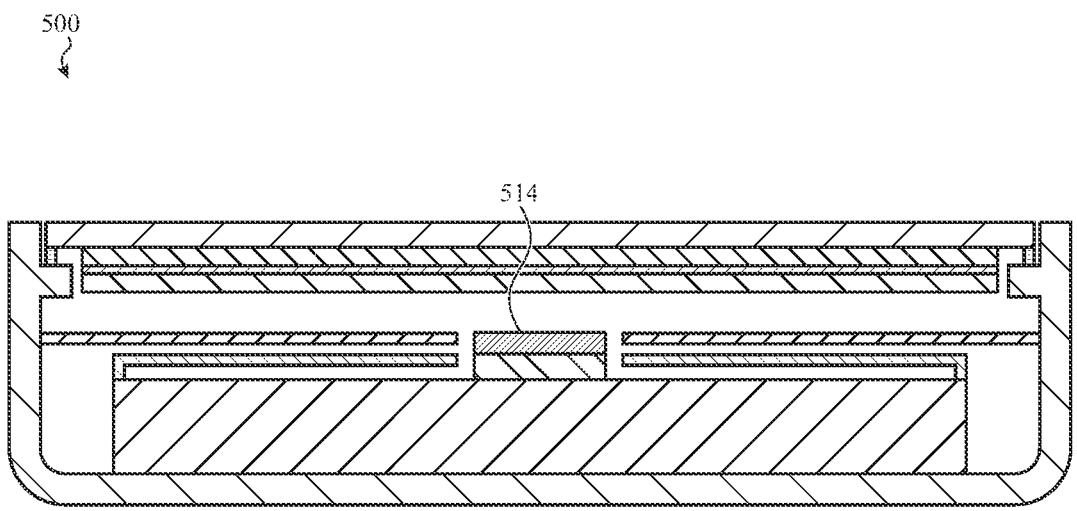
FIG. 5 depicts a first alternative example of the example electronic device of FIG. 2A.

FIG. 5 depicts a first alternative example of the example electronic device 100 of FIG. 2A. As discussed above, the compliant material 214 of the electronic device 100 may be configured with a variety of different thicknesses. The electronic device 500 of FIG. 5 illustrates a first alternative where a compliant material 514 is thicker than the compliant material 214 of the electronic device 100. For example, the compliant material 514 may have a thickness of 650 µm whereas the compliant material 214 of the electronic device 100 may have a thickness of 330 µm.

Figure 6A:
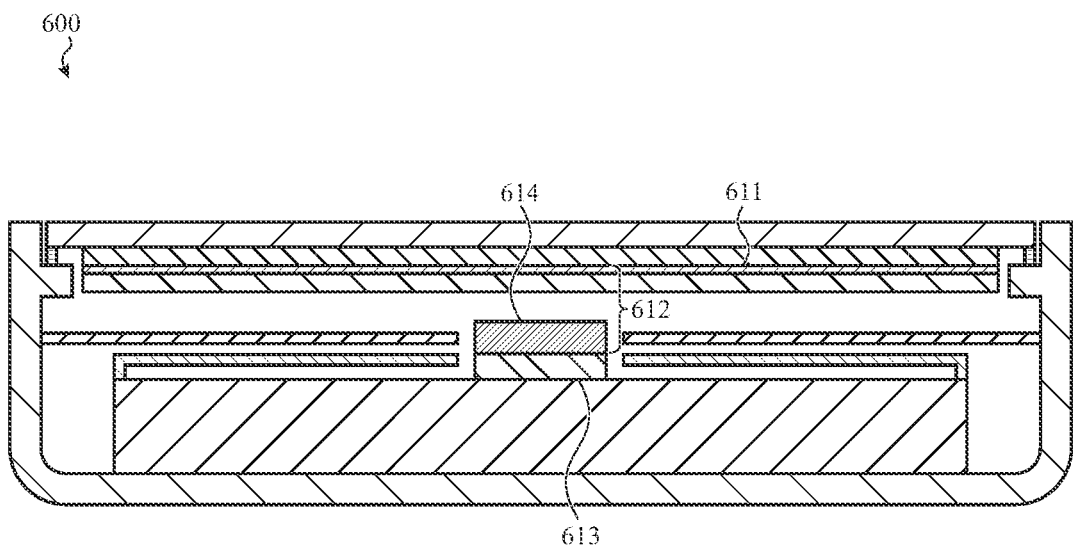
FIG. 6A depicts a second alternative example of the example electronic device of FIG. 2A.
Figure 6B:
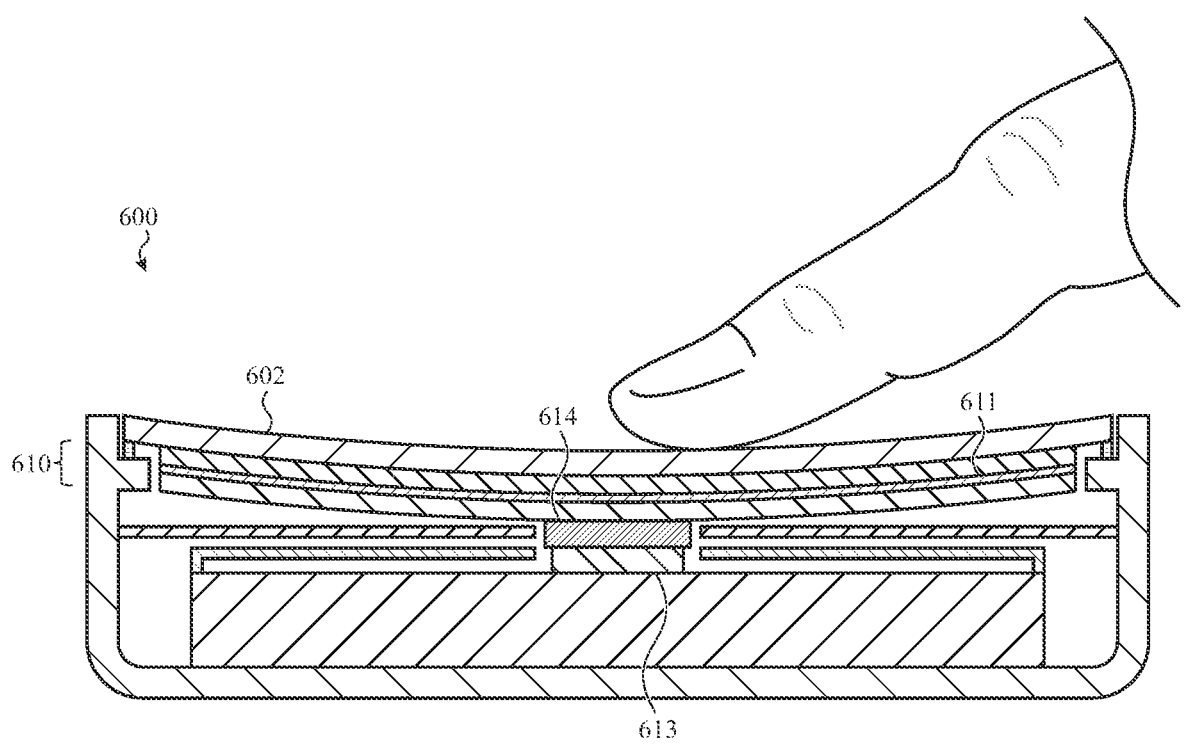
FIG. 6B shows the example electronic device of FIG. 6A when a force applied to the cover deforms the display.

Similarly, FIG. 6A depicts a second alternative example of the example electronic device 100 of FIG. 2A where a compliant material 614 of the electronic device 600 is thicker than both the compliant material 214 of the electronic device 100 of FIG. 2A and the compliant material 514 of the electronic device 500 of FIG. 5. For example, the compliant material 614 may have a thickness of 800 µm whereas the compliant material 214 of the electronic device 100 may have a thickness of 330 µm and the compliant material 514 may have a thickness of 650 µm. The thicker the compliant material 614, the more that the effective electrical distance between the conductive component 611 and the sensor assembly 613 within the dielectric or capacitive gap 612 may be decreased. FIG. 6B shows the example electronic device 600 of FIG. 6A when a force applied to the cover 602 deforms the display 610 such that the bottom of the display 610 contacts and deforms the compliant material 614. Various configurations are possible and contemplated without departing from the scope of the present disclosure.

Returning to FIG. 2A, the display 210 is illustrated and described above as an LCD and the conductive component 211 is illustrated and described above as a TFT component. However, as discussed above, the display 210 may be any other kind of display and the conductive component 211 may be another kind of conductive component of such a display without departing from the scope of the present disclosure.

Figure 7:
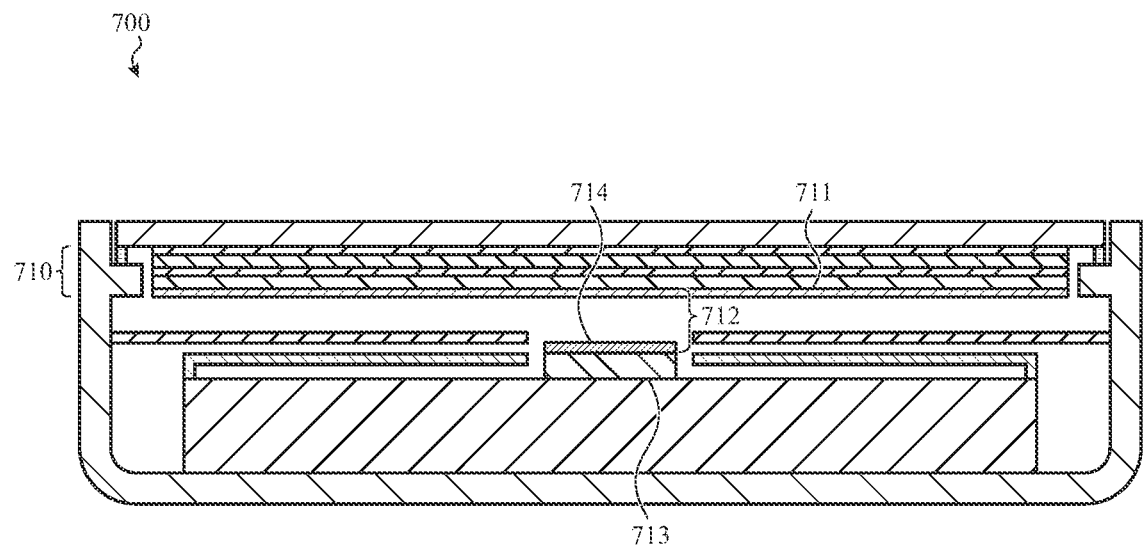
FIG. 7 depicts a third alternative example of the example electronic device of FIG. 2A.

By way of example, FIG. 7 depicts a third alternative example of the example electronic device 100 of FIG. 2A. The electronic device 700 may include an OLED display 710 that has one or more layers, such as a conductive component layer 711. A sensor assembly 713 may be operative to detect changes in capacitance and/or resistance between one or more electrodes included therein and the conductive component layer 711 across a dielectric or capacitive gap 712. Similar to the electronic device 100 of FIG. 2A, a compliant material 714 may be coupled to the sensor assembly 713. Various configurations are possible and contemplated without departing from the scope of the present disclosure.

Returning to FIG. 2A, the compliant material 214 is illustrated and described as coupled to the sensor assembly 213. However, it is understood that this is an example. In various implementations, the compliant material 214 may be otherwise positioned between the display 210 and the sensor assembly 213 without departing from the scope of the present disclosure.

Figure 8:
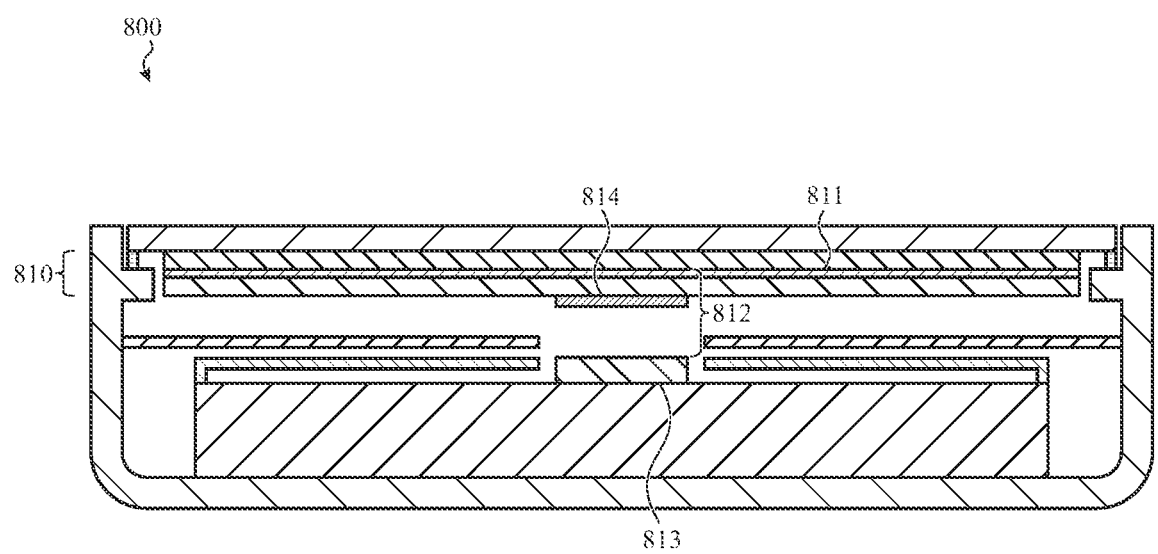
FIG. 8 depicts a fourth alternative example of the example electronic device of FIG. 2A.

By way of a first example, FIG. 8 depicts a fourth alternative example of the example electronic device 100 of FIG. 2A. The electronic device 800 may include a compliant material 814 coupled to a display 810. Similar to the electronic device 100 of FIG. 2A, a sensor assembly 813 may be operative to detect changes in capacitance and/or resistance between one or more electrodes included therein and a conductive component 811 of the display 810 across a dielectric or capacitive gap 812. Various configurations are possible and contemplated without departing from the scope of the present disclosure.

Figure 9:
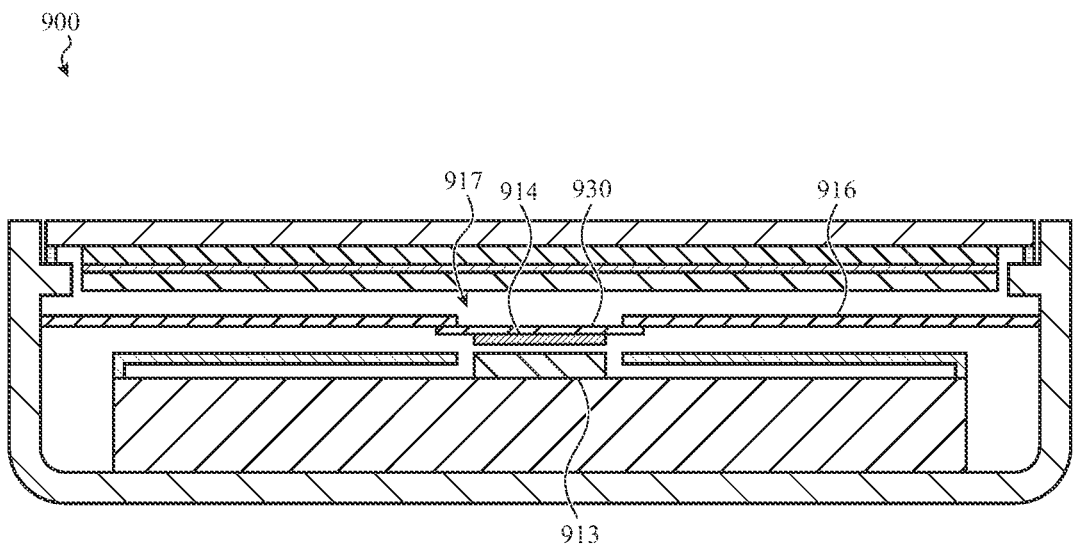
FIG. 9 depicts a fifth alternative example of the example electronic device of FIG. 2A.

By way of a second example, FIG. 9 depicts a fifth alternative example of the example electronic device 100 of FIG. 2A. The electronic device 900 may include a compliant material 914 coupled to a structural element 916 over an aperture 917 via a nonconductive connector 930. As shown, the compliant material 914 may be coupled to the nonconductive connector 930 over a sensor assembly 913. Various configurations are possible and contemplated without departing from the scope of the present disclosure.

Figure 10:
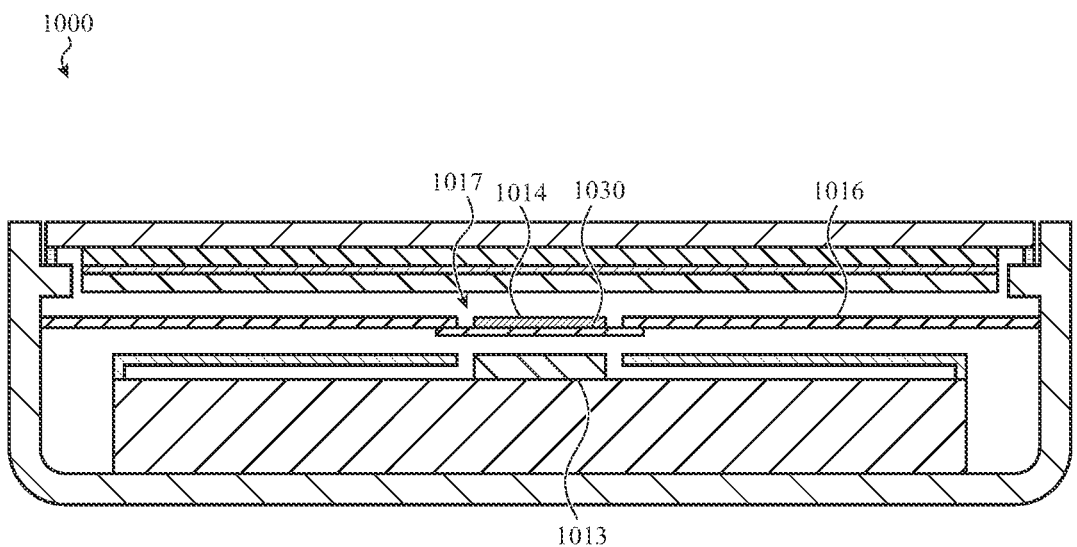
FIG. 10 depicts a sixth alternative example of the example electronic device of FIG. 2A.

By way of a third example, FIG. 10 depicts a sixth alternative example of the example electronic device 100 of FIG. 2A. The electronic device 1000 may include a compliant material 1014 coupled to a structural element 1016 over an aperture 1017 via a nonconductive connector 1030. As contrasted with the electronic device 900 of FIG. 9, the nonconductive connector 1030 may separate the compliant material 1014 from a sensor assembly 1013 and position the compliant material 1014 partially and/or fully within the aperture 1017. Various configurations are possible and contemplated without departing from the scope of the present disclosure.

As contrasted with the example implementations of FIGS. 2 and 5-8, the example implementations of FIGS. 9 and 10 may have two gaps between the respective electrodes and the compliant materials 914, 1014 instead of just one where signal magnitude may modulate as 1/x in each gap. As a result, it may be challenging to accurately estimate non-binary amounts of applied force and/or other analog force sensor applications. However, this may not be an issue in implementations where determinations are made as to whether or not force is applied as thresholds for determining such using forces expected to be applied may be set accordingly.

Figure 11:
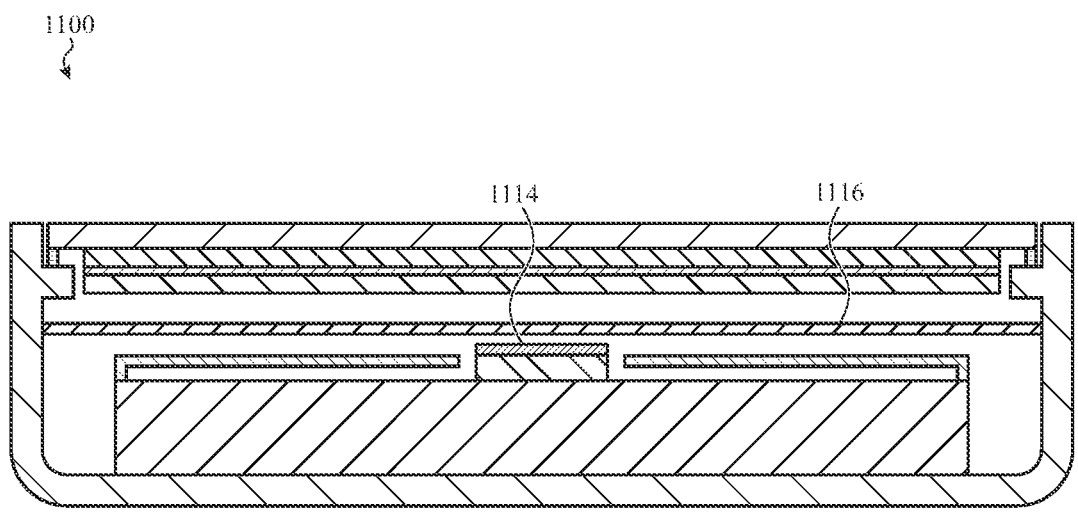
FIG. 11 depicts a seventh alternative example of the example electronic device of FIG. 2A.

By way of a fourth example, FIG. 11 depicts a seventh alternative example of the example electronic device 100 of FIG. 2A. Contrasted with the electronic device 100 of FIG. 2A, the electronic device 1100 may include a compliant material 1114 separated from a structural element 1116 that does not define an aperture. In this example, the structural element 1116 may be formed of nonconductive materials so as not to interfere with a force sensor included in the electronic device 1100. Alternatively, such a force sensor may detect capacitance changes between the structural element 1116 and one or more electrodes. Various configurations are possible and contemplated without departing from the scope of the present disclosure.

Returning to FIG. 2A, although the compliant material 214 is illustrated and described as a single piece of material, it is understood that this is an example. However, other configurations are possible and contemplated without departing from the scope of the present disclosure.

Figure 12:
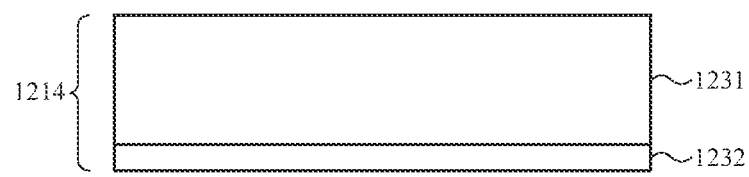
FIG. 12 depicts a first example of a compliant material assembly that may be used in the example electronic devices of FIGS. 2A and/or 5-7.

By way of illustration, FIG. 12 depicts a side view of a first example of a compliant material assembly 1214 that may be used in the example electronic devices of FIGS. 2A and/or 5-7. The compliant material assembly 1214 may include conductive foam 1231 that is used as a sensing electrode and is coupled to conductive adhesive 1232. Various configurations are possible and contemplated without departing from the scope of the present disclosure.

Figure 13A:
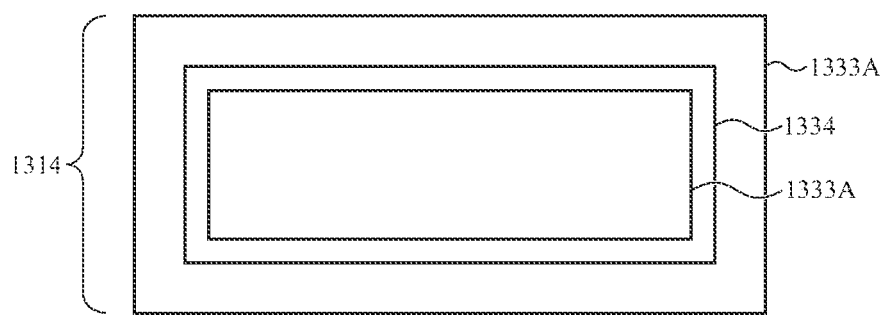
FIG. 13A depicts a second example of a compliant material assembly that may be used in the example electronic devices of FIGS. 2A and/or 5-7.

FIG. 13A depicts a second example of a compliant material assembly 1314 that may be used in the example electronic devices of FIGS. 2A and/or 5-7. FIG. 13A shows a top view of the compliant material assembly 1314, whereas the compliant material 214 may be illustrated from a side view in FIG. 2A. The compliant material assembly 1314 may include an inner area of conductive foam 1333A that is used as a sensing electrode and is separated from an outer area of conductive foam 1333A that is used as a shield by insulating nonconductive foam 1334. Various configurations are possible and contemplated without departing from the scope of the present disclosure.

Figure 13B:
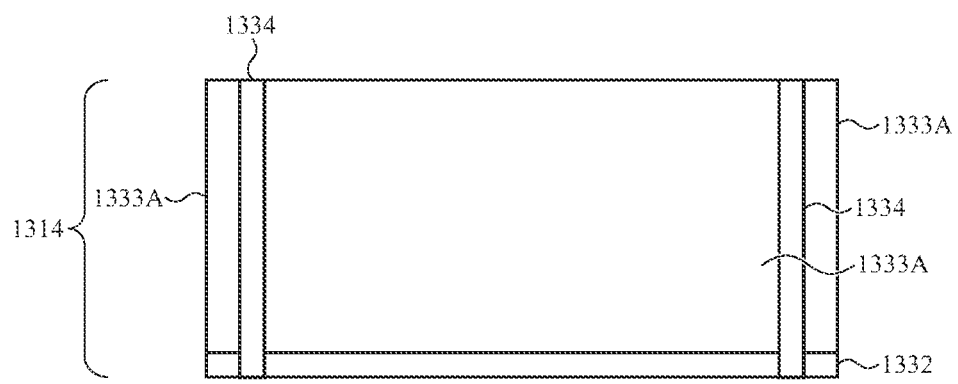
FIG. 13B depicts a third example of a compliant material assembly that may be used in the example electronic devices of FIGS. 2A and/or 5-7.

FIG. 13B depicts a side view of a third example of a compliant material assembly 1314 that may be used in the example electronic devices of FIGS. 2A and/or 5-7. The compliant material assembly 1314 may include one or more areas of conductive foam 1333A, one or more areas of insulating nonconductive foam 1334, and conductive adhesive 1332. In some implementations, FIG. 13B may illustrate a cross section of FIG. 13A, such as taken along a line across the middle of FIG. 13A from left to right. Various configurations are possible and contemplated without departing from the scope of the present disclosure.

Figure 14:
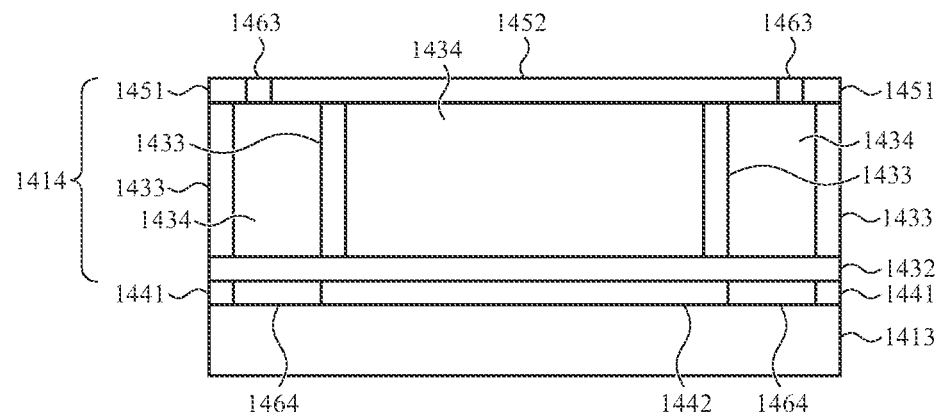
FIG. 14 depicts a fourth example of a compliant material and sensor assembly stack that may be used in the example electronic devices of FIGS. 2A and/or 5-7.

FIG. 14 depicts a fourth example of a compliant material 1414 and sensor assembly 1413 stack that may be used in the example electronic devices of FIGS. 2A and/or 5-7. A sensing electrode 1452 and a shield 1451 may be configured on a stack of materials that form the compliant material 1414. The sensing electrode 1452 and/or the shield 1451 may be formed of compliant conductive material and may be positioned, separated by nonconductive material 1463, on an arrangement of nonconductive foam 1434 and compressible vias 1433. As such, the nonconductive foam 1434 may act as a base material similar to the base material of a printed circuit board.

The compressible vias 1433 may be connected to an anisotropic conductive adhesive 1432 that may in turn be connected to a drive and/or sense connector 1442 and a shield connector 1441. The drive and/or sense connector 1442 and the shield connector 1441, which may be separated by air gaps 1464 and/or nonconductive material in place of such air gaps 1464, may connect the anisotropic conductive adhesive 1432 to a sensor assembly 1413, which may be a SIP. The anisotropic conductive adhesive 1432 may be conductive only in the direction between the compressible vias 1433 and the drive and/or sense connector 1442 and the shield connector 1441 so that the drive and/or sense connector 1442 and the shield connector 1441 may be electrically isolated from each other.

Figure 15:
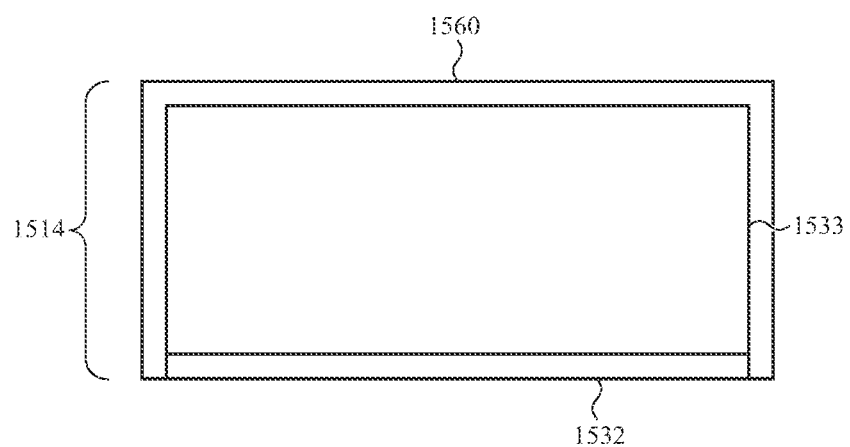
FIG. 15 depicts a fourth example of a compliant material assembly that may be used in the example electronic devices of FIGS. 2A and/or 5-7.

FIG. 15 depicts a fourth example of a compliant material assembly 1514 that may be used in the example electronic devices of FIGS. 2A and/or 5-7. The compliant material assembly 1514 may include conductive foam 1533 that is coupled to conductive adhesive 1532 and coated with a nonconductive coating 1560. Various configurations are possible and contemplated without departing from the scope of the present disclosure.

Figure 16:
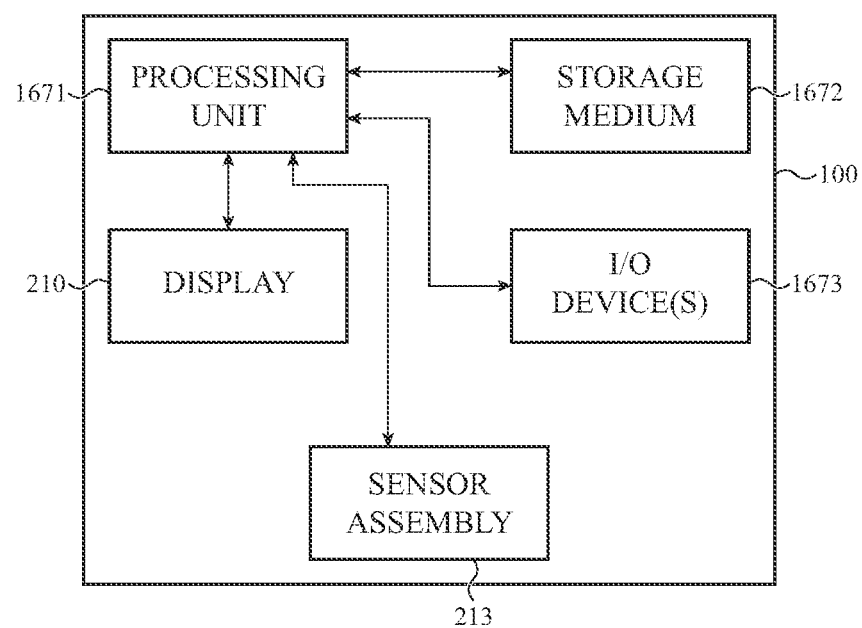
FIG. 16 depicts example functional relationships between example components that may be used to implement the example electronic devices of FIGS. 2A and/or 5-7.

FIG. 16 depicts example functional relationships between example components that may be used to implement the example electronic devices 100, 500, 600, 700 of FIGS. 2A and/or 5-7. For example, the electronic device 100 may include one or more processing units 1671 and/or other processors or controllers, one or more non-transitory storage media 1672 (which may take the form of, but is not limited to, a magnetic storage medium; optical storage medium; magneto-optical storage medium; read only memory; random access memory; erasable programmable memory; flash memory; and so on), one or more input and/or output devices 1673 (such as one or more microphones, speakers, keyboards, virtual keyboards, computer mice, track pads, track balls, touch surfaces, and so on), one or more displays 210, one or more sensor assemblies 213, and so on.

The processing unit 1671 may execute one or more instructions stored in the storage medium 1672 to perform various functions. Examples of such functions include, but are not limited to, performing one or more methods involving techniques of the present disclosure, detecting one or more capacitances and/or resistances between one or more conductive components of the display and/or electrodes of the sensor assembly 213 and/or changes in such capacitances and/or resistances, detecting one or more inputs using such changes in such capacitances and/or resistances, estimating one or more non-binary amounts of one or more applied forces using such changes in such capacitances and/or resistances, determining application of one or more forces and/or threshold amounts of forces using such changes in such capacitances and/or resistances (such as to emulate a button click/not-clicked experience), estimating one or more locations of one or more touches or applied forces using such changes in such capacitances and/or resistances, interpreting estimated applied forces as one or more inputs, interpreting estimated locations of applied forces or touches as one or more inputs, and so on. Various configurations are possible and contemplated without departing from the scope of the present disclosure.

Although a number of embodiments are illustrated and discussed above, it is understood that these are examples. Any number of features of these embodiments may be combined into other embodiments without departing from the scope of the present disclosure. Various configurations are possible and contemplated.

In various implementations, an electronic device may include a housing; a display coupled to the housing and configured to receive a force, further configured to deform in response to the force; a sense electrode positioned within the housing and capacitively coupled to the display across an air gap defined between the sense electrode and the display; a processing unit operative to estimate an amount of the force based, at least in part, on a change in capacitance between the display and the sense electrode; and a conductive compliant material. The conductive compliant material may be positioned in the housing within the air gap between the display and the sense electrode.

In some examples, the display may be operable to contact the conductive compliant material during deformation. In other examples, the display may remain separate from the conductive compliant material during deformation.

In a number of examples, the conductive compliant material may be coupled to at least one of the display or the sense electrode. In some examples, the electronic device further includes a midplate coupled to the housing between the sense electrode and the display wherein the conductive compliant material is coupled to the midplate. In various examples, the conductive compliant material may be coupled to the sense electrode by a conductive adhesive. In a number of examples, the electronic device may further include an insulating material coating the conductive compliant material.

In some implementations, an electronic device may include a cover; a force sensor that is operable to measure a force exerted on the cover that changes a capacitive gap of the force sensor, the force sensor including a display component coupled to the cover and a sensor assembly coupled to a substrate across an air gap; and a compliant material positioned in the air gap. The compliant material may include a conductive portion, decrease an effective electrical distance of the capacitive gap, and prevent damage to the force sensor by absorbing at least a portion of the force.

In various examples, the compliant material may include the conductive portion and a nonconductive portion. In some examples, the compliant material may include a first conductive material connected to a sensing electrode of the force sensor and a second conductive material that functions as a shield electrode. In various such examples, the compliant material may further include insulating material separating the first conductive material and the second conductive material.

In some examples, the compliant material may include at least one of a conductive foam, a silicone gasket, an air loop gasket, a fabric, or a conductive adhesive. In a number of examples, the compliant material may be compressible. In various examples, the compliant material may have a thickness of approximately 250-950 microns.

In a number of implementations, an electronic device may include a housing; a drive electrode that is operable to deform when a force is exerted; a sense electrode that is operable to detect a change in capacitance when the drive electrode deforms, the sense electrode separated from the drive electrode by a gap; and a conductive compliant material. The conductive compliant material may be positioned in the gap and electrically connected to the sense electrode, the conductive compliant material separated from the drive electrode in the absence of the force and contacted by the drive electrode when the force is exerted.

In some examples, the sense electrode may be resistively coupled to the conductive compliant material. In other examples, the sense electrode may be capacitively coupled to the conductive compliant material.

In various examples, the electronic device may further include a shield electrode capacitively coupled to the conductive compliant material. In some such examples, the electronic device may further include a nonconductive material separating the shield electrode and the conductive compliant material. In various of such examples, the nonconductive material may separate the sense electrode and the conductive compliant material.

As described above and illustrated in the accompanying figures, the present disclosure relates to a compliant material for protecting capacitive force sensors and increasing capacitive sensitivity. A compliant material, such as a conductive foam, may be positioned in the dielectric or capacitive gap between drive and sense electrodes and/or other conductive elements of a capacitive and/or other force sensor, such as a TFT or other display element and a sensor assembly. The compliant material may prevent damage by preventing and/or cushioning contact. The compliant material may be conductive. By being conductive and being positioned between the electrodes while still being separated from one or more of the electrodes, the compliant material may also shorten the effective electrical distance between the electrodes. As a result, the force sensor may be more sensitive than would otherwise be possible while being less vulnerable to damage.

In the present disclosure, any methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may utilize a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
    a housing;
    an electronic component coupled to the housing;
    an electrode positioned within the housing and capacitively coupled to the electronic component across an air gap defined between the electrode and the electronic component;
    a processing unit operative to estimate an amount of a force that deforms the electronic component based, at least in part, on a change in capacitance between the electronic component and the electrode; and
    a conductive compliant material positioned in the housing within the air gap between the electronic component and the electrode.

2. The electronic device of claim 1, wherein the electronic component is operable to contact the conductive compliant material during deformation.

3. The electronic device of claim 1, wherein the electronic component remains separate from the conductive compliant material during deformation.

4. The electronic device of claim 1, wherein the conductive compliant material is coupled to at least one of:
    the electronic component; or
    the electrode.

5. The electronic device of claim 1, further comprising a midplate coupled to the housing between the electrode and the electronic component wherein the conductive compliant material is coupled to the midplate.

6. The electronic device of claim 1, wherein the conductive compliant material is coupled to the electrode by a conductive adhesive.

7. The electronic device of claim 1, further comprising an insulating material coating the conductive compliant material.

8. An electronic device, comprising:
a component that defines an external surface of the electronic device;
a force sensor that is operable to measure a force exerted on the component that changes a capacitive gap of the force sensor, the force sensor including a first electrode coupled to the component and a second electrode coupled to a substrate across an air gap; and
a compliant material positioned in the air gap that:
includes a conductive portion; and
absorbs at least a portion of the force.

9. The electronic device of claim 8, wherein the compliant material comprises the conductive portion and a nonconductive portion.

10. The electronic device of claim 8, wherein the compliant material includes:
a first conductive material connected to the second electrode of the force sensor; and
a second conductive material that functions as a shield electrode.

11. The electronic device of claim 10, wherein the compliant material further includes insulating material separating the first conductive material and the second conductive material.

12. The electronic device of claim 8, wherein the compliant material comprises at least one of:
a conductive foam;
a silicone gasket;
an air loop gasket;
a fabric; or
a conductive adhesive.

13. The electronic device of claim 8, wherein the compliant material is compressible.

14. The electronic device of claim 8, wherein the compliant material has a thickness of 250-950 microns.

15. An electronic device, comprising:
a housing;
a first electrode that is operable to deform when a force is exerted;
a second electrode that is separated from the first electrode by a gap;
a processing unit that is operable to detect a change in capacitance between the first electrode and the second electrode when the first electrode deforms; and
a conductive compliant material positioned in the gap and electrically connected to a first of the first electrode and the second electrode, the conductive compliant material separated from a second of the first electrode and the second electrode in an absence of the force and contacted by the second of the first electrode and the second electrode when the force is exerted.

16. The electronic device of claim 15, wherein the first of the first electrode and the second electrode is resistively coupled to the conductive compliant material.

17. The electronic device of claim 15, wherein the first of the first electrode and the second electrode is capacitively coupled to the conductive compliant material.

18. The electronic device of claim 15, further comprising a shield electrode capacitively coupled to the conductive compliant material.

19. The electronic device of claim 18, further comprising a nonconductive material separating the shield electrode and the conductive compliant material.

20. The electronic device of claim 19, wherein the nonconductive material separates the first of the first electrode and the second electrode and the conductive compliant material.

\* \* \* \* \*